May 29, 1928.
A. L. DENTLER ET AL
1,671,515
TIRE PRESSURE INDICATOR
Filed Aug. 28, 1926
2 Sheets-Sheet 1
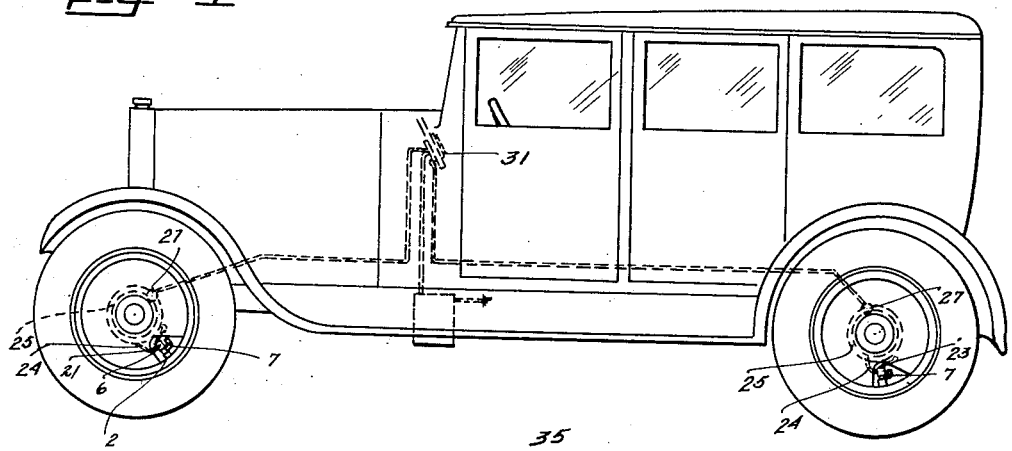
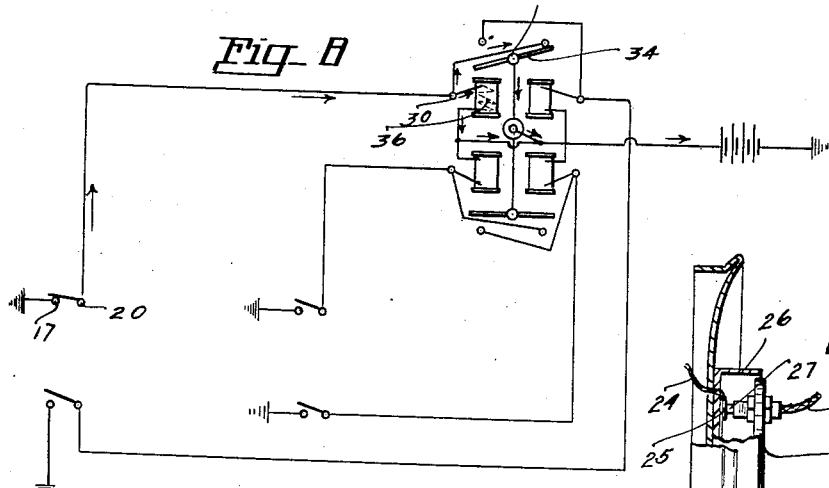
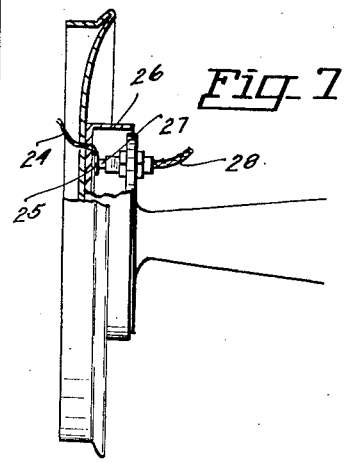
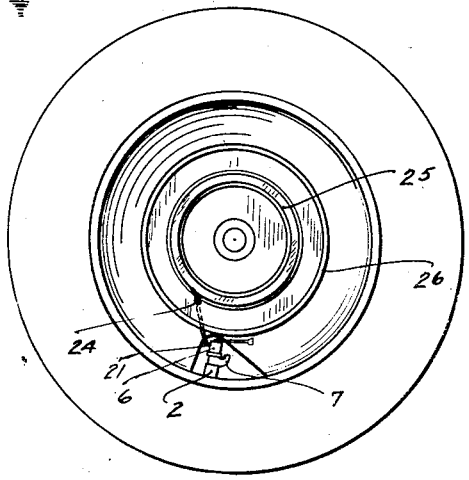
Inventors
Arthur L. Dentler
Ralph L. Lesch
Attorney
Thomas Bilyeu

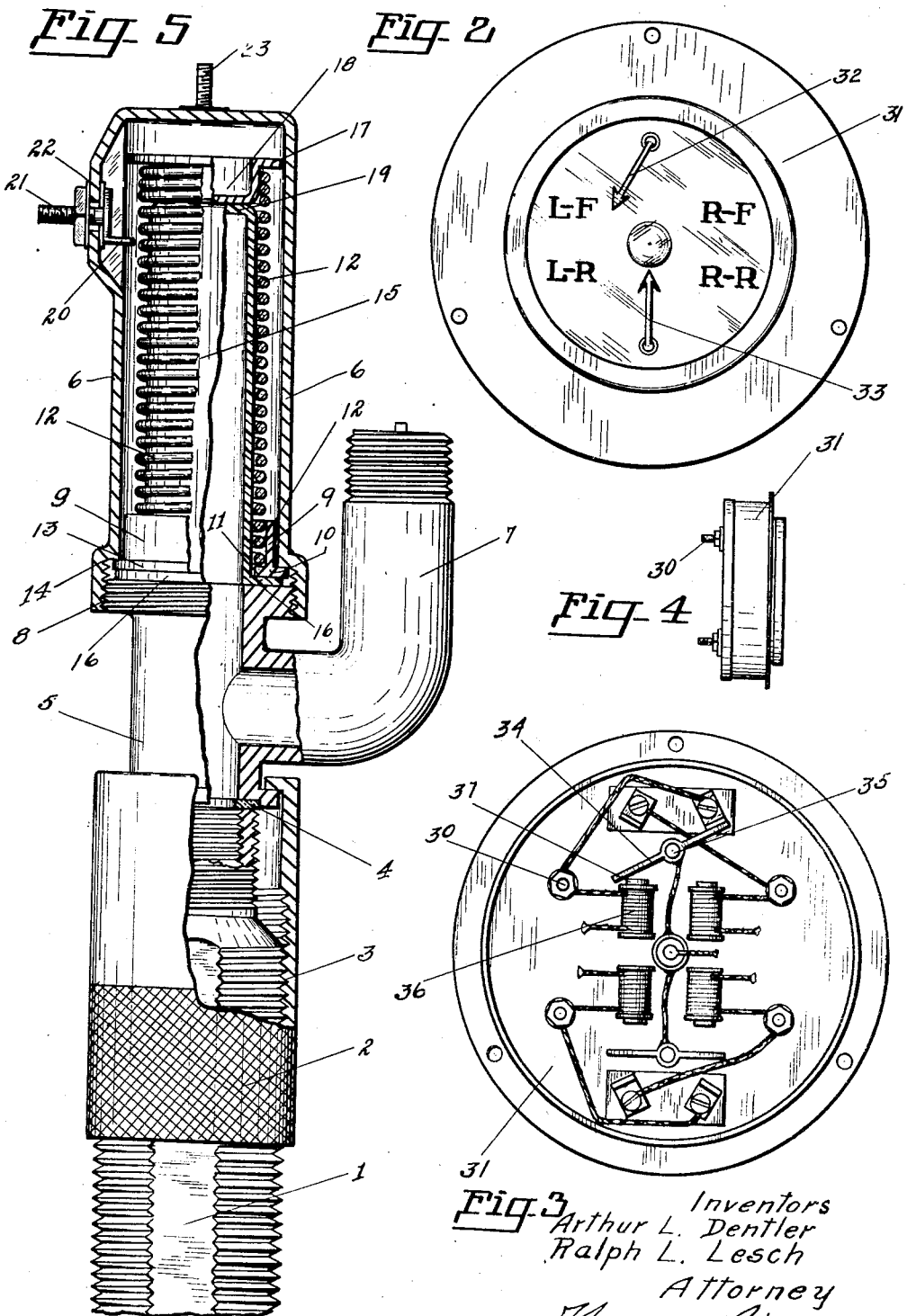

Patented May 29, 1928.

1,671,515

UNITED STATES PATENT OFFICE.

ARTHUR L. DENTLER AND RALPH L. LESCH, OF PORTLAND, OREGON.

TIRE-PRESSURE INDICATOR.

Application filed August 28, 1926. Serial No. 132,196.

Our invention relates to a tire pressure indicator adapted for use upon vehicles having pneumatic tires disposed thereupon and the object of the invention is to indicate within the line of vision of the operator of the vehicle the critical low pressure within the tire casing.

Our device consists primarily of a simple and efficient device adapted to be placed upon the stem of the inner tube of pneumatic tires and having means provided therein to complete an electric circuit, when the tire pressure has dropped to the critical point, and to indicate, in which tire the critical pressure has been reached, upon a dial to be disposed within the range of vision of the operator of the vehicle.

It is proposed to construct the devices in such a way that they may be adapted for use upon tires carrying different pressures, as large or small tires and balloon tires.

Still further objects of our invention consist in making the device of but few parts and of simple construction, and a device that may be easily installed and one that will not easily get out of order.

With these and incidental objects in view, the invention consists in certain novel features of construction and combination of parts, the essential elements of which are set forth in the appended claims and a preferred form of embodiment of which is hereinafter shown with reference to the drawings which accompany and form a part of this specification.

In the drawings—

Fig. 1 is a side elevation of a motor vehicle showing our new and improved device installed thereupon.

Fig. 2 is a front elevation of the dial and the indicators disposed thereupon for indicating the critical pressure and the wheel upon which the critical pressure has been reached.

Fig. 3 is a rear view of the mechanism illustrated in Fig. 2.

Fig. 4 is a side elevation of the mechanism illustrated in Fig. 2 and in Fig. 3.

Fig. 5 is a longitudinal view, partially in section, of one of the devices to be attached to the stem of the inner tube.

Fig. 6 illustrates one of our devices attached to the wheel of the vehicle.

Fig. 7 is a side elevation, partially in section of the wheel connection illustrating the collector ring disposed upon the inner housing of the brake drum and the electric connection between the same and the wiring circuit connection.

Fig. 8 is a diagrammatical layout of the electric circuits.

Like reference characters refer to like parts throughout the several views.

1 is the stem of the inner tube, to which the sleeve 2 is attached by thread engagement as shown at 3 and an air tight connection is secured therebetween through the action of the annular packing member 4. Member 5 is placed between the sleeve 2 and the pressure cylinder 6 and has disposed upon one side thereof an air inlet stem 7 having disposed on the inside thereof a valve for admitting the air pressure therethrough and to prevent the escapement of the pressure of the air, the same being similar in design and construction to valves now in general use for this purpose. An annular groove is formed on its engaging end with the sleeve 2 for the seating of the packing member 4 therein. Threaded engagement is provided between the pressure cylinder 6 and the intermediate member 5 as shown at 8. Disposed within the inner end of the pressure cylinder 6 is an annular ring 9 having an annular head 10 formed upon one end the object of which is to form a ledge 11 on its inner side to permit the engagement of the pressure indicating spring 12 resting thereupon on its one side and to act as a gland 13 for engagement with a seat 14 formed upon the inner end of the pressure cylinder 6 as shown in Fig. 5. Disposed within the pressure tension indicating spring 12 is an expansible, contractible air tight bag or container 15, the same being open ended on its one end and having formed thereon an annular head having a flange 16 formed about its outer periphery which forms a packing member between the outer end of 5 and the inner end of 13. The compressible spring 12 has disposed upon its outer end an annular ring 17 having a seat 18 formed central thereof against which the upper end 19 of the bag 15 engages. The greater the air pressure within the bag 15 and the tire the greater will be the extension of the spring 12 and as the pressure within the tire decreases the compression spring will shorten. The annular ring 17 is secured to the compression spring 12 by any suitable means to prevent the same being lifted clear of the spring, and the inner end of the compression spring is secured to the member 11 upon which it is seated; thus forming a complete assembly that is self contained. The annular ring 17 extends sufficiently beyond the outer diameter of the spring to permit of a free contacting of the under side of the annular ring with the electric contact point 20 of the terminal 21. The terminal 21 is insulated as at 22 from the wall of the cylinder 6. The electric circuit is grounded at 23 to the top of the cylinder 6. Conduit 24 is attached to the terminal outlet from the cylinder 6 and this connects to the collector ring 25 as preferably disposed within the housing of the brake drum 26 wherein the same may be kept substantially free from mud, dust, grease and other objectionable surface coatings. Contact point 27 engages with the collector ring and when the circuit is completed through a letting down of the pressure within the tire the current then flows through the terminal 21 and the conductor 24 to the collector ring 25 and thence through the contact point 27 and the conductor 28, to the binder post 30 disposed at the rear of the indicating dial 31. The dial indicator is preferably placed upon the dial board or dash of the vehicle and the same may be made to indicate the pressure in any or all of the tires of the vehicle. The dial, here shown, is adapted to an automobile of four wheels. The dial having two pointers 32 and 33, disposed thereupon, each of the pointers indicating tires disposed upon oppositely disposed ends of the vehicle the left front wheel and the right front wheel, or as the left rear wheel and the right rear wheel. Each of the pointers here shown are rockably mounted within the dial structure and are adapted to being rocked in either direction by magnetic force upon the closing of the circuit from either side thereof, which will rock the pointer in the direction indicated upon the dial which indicated the location of the tire indicated. Markings are disposed upon the dial for each pointer designating the tire indicated by the movement of the pointer. The normal position of the pointer is that of being substantially vertical. A bar 34 is disposed upon the rear end of the staff 35 supporting the bar and connecting the bar 34 with the indicator, 32. If the electric current flows through the coil, 36 the core 37 therein will be magnetized and the bar will be rotated about the center of support thus turning the indicator as illustrated in Fig. 2 to indicate that the left front tire has an air pressure below the critical point; whereas if the current should flow through the coil on the opposite side due to the completion of the circuit due to a low air pressure the indicating pointer would be rotated to the opposite direction, thus indicating that the pressure was low in the tire on the right front wheel.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What we claim is—

1. New and improved tire pressure indicator, comprising a threaded element adapted to threaded engagement with the valve stem and with an intermediate element, an intermediate element having an inlet passage and a valve disposed within the inlet passage, a cylinder in threaded engagement with the intermediate element, a compression coil spring disposed and seated within the cylinder, an expansible, contractible air tight sack disposed within the cylinder, an annular cap disposed upon the coil spring and seating the air tight sack, an electric terminal disposed through the wall of the cylinder and an electric contact carried by said spring adapted to contact with said terminal when said spring is contracted.

2. In combination in a new and improved tire pressure indicator, of an element adapted to threaded engagement with the stem of an inner tube and to threaded engagement with an intermediate element, an intermediate element, air inlet means disposed within the intermediate element and a cylinder superposed upon the intermediate element and in threaded relation therewith, a compression spring disposed within the cylinder, an air tight expansible, contractible, sack disposed within the compression spring, an annular member on said spring, and an electric terminal engaged by said annular member substantially as described.

ARTHUR L. DENTLER.
RALPH L. LESCH.